United States Patent
Porter

(10) Patent No.: US 6,176,095 B1
(45) Date of Patent: Jan. 23, 2001

(54) PRETRIP DEVICE FOR TESTING OF A REFRIGERATION SYSTEM COMPRESSOR

(75) Inventor: Kevin J. Porter, Syracuse, NY (US)

(73) Assignee: Carrier Corporation, Syracuse, NY (US)

(*) Notice: Under 35 U.S.C. 154(b), the term of this patent shall be extended for 0 days.

(21) Appl. No.: 09/234,041

(22) Filed: Jan. 19, 1999

(51) Int. Cl.⁷ .................................................. F25B 49/02
(52) U.S. Cl. ........................ 62/126; 62/127; 62/196.2; 62/228.5
(58) Field of Search .............................. 62/125, 126, 127, 62/129, 228.3, 196.1, 196.2, 196.3, 228.5, 131

(56) References Cited

U.S. PATENT DOCUMENTS

| | | | |
|---|---|---|---|
| 2,401,827 | * 6/1946 | Heitchue | 62/196.2 X |
| 3,110,160 | * 11/1963 | Miner | 62/228.3 X |
| 4,848,096 | * 7/1989 | Funahashi et al. | 62/228.3 X |
| 5,140,825 | 8/1992 | Hanson et al. | |
| 5,172,561 | 12/1992 | Hanson et al. | |
| 5,209,076 | * 5/1993 | Kauffman et al. | 62/126 |

* cited by examiner

Primary Examiner—Harry B. Tanner
(74) Attorney, Agent, or Firm—Wall Marjama & Bilinski

(57) ABSTRACT

A refrigeration/heating system for cooling or heating an area includes a condenser for removing heat from the system to an external environment, an evaporator for receiving heat from the area to be cooled or delivering heat to the area to be heated, and a compressor for raising the pressure and the temperature of a refrigerant. The compressor has at least one cylinder bank and an unloader connected to the cylinder bank for loading and unloading the cylinder bank. Pressure transducers measure the suction and discharge pressures of the compressor when the state of a cylinder bank is changed from a loaded to an unloaded state. A processor uses the suction and discharge pressures in the various states to determine the operational condition of either unloader. By varying the loading and unloading of a pair of cylinder banks, the processor can also use various suction and discharge pressures to determine if a problem exists within either cylinder bank or unloader.

23 Claims, 11 Drawing Sheets

PRETRIP DEVICE FOR TESTING OF A REFRIGERATION SYSTEM COMPRESSOR

FIELD OF THE INVENTION

This invention relates to the field of refrigeration systems for heating or cooling a controlled environment, and in particular to the compressor of the refrigeration system, and more particularly to a device or method for determining the operational condition of a compressor.

BACKGROUND OF THE INVENTION

Refrigeration systems are used in many applications for heating and cooling a controlled environment, including a cargo box on a transport truck, train, ship or plane. The refrigeration system has many components including a condenser, an evaporator, and a compressor. The compressor typically includes a plurality of cylinder banks, where at least one of the cylinder banks has an unloader for loading and unloading the cylinder bank. Before transporting cargo, it is desirable to determine whether the refrigeration system is in an operational condition.

There have been some attempts to use a pretrip device to determine the operational condition of the refrigeration system prior to transportation. One such device to Hanson et al., U.S. Pat. No. 5,172,561, includes a pretrip device which determines the operational condition of the refrigeration system as a function of temperature change. When the box is humid, the refrigeration system will remove moisture from the air prior to changing the temperature. As a result, this device has a propensity for false alarms. Further, this device does not have the capability to isolate the particular problem within the refrigeration system.

When an alarm is signaled, the refrigeration system must be taken out of service and be inspected for problems, which takes time and costs money. When the alarm is false, it takes longer to service because there are no identifiable problems.

Further, the pretrip device of Hanson et al. does not have the capability to identify a particular problem with or within a compressor. As a result, the entire refrigeration system must be tested by a technician in order to isolate and repair a problem within a compressor. Due to the mechanical complexity of a compressor including many components, troubleshooting a compressor results in a significant loss of time and money.

SUMMARY OF THE INVENTION

Therefore, it is an object of the present invention to overcome the limitations of the prior art.

It is a further object of the present invention to provide a pretrip device operating a pretrip subroutine for determining the operational condition of a compressor of a refrigeration system.

It is another object of the present invention to provide a pretrip device operating a pretrip subroutine to determine the operational condition of an unloader of a compressor prior to placing the compressor in a cooling or heating/defrost mode of operation.

It is yet another object of the present invention to provide a pretrip device operating a pretrip subroutine to signal an alarm when an unloader is in a non-operational condition.

It is still another object of the present invention to provide a pretrip device operating a pretrip subroutine that results in a minimal number of false alarms.

It is a further object of the present invention to provide a pretrip device operating a pretrip subroutine to determine the operational condition of an individual cylinder bank of a compressor. It is another object of the present invention to provide a pretrip device operating a pretrip subroutine to signal an alarm when a problem exists within a cylinder bank of a compressor.

These and other objects are provided for by a device for testing the operational performance of a compressor, wherein said compressor includes at least one cylinder bank and at least one unloader, said at least one cylinder bank being connected to said at least one unloader, said at least one unloader for loading and unloading said at least one cylinder bank, said device comprising:

pressure sensing means for sensing a pressure differential indicator of said compressor; and determining means responsive to said pressure sensing means for determining the operational state of said compressor based on said pressure differential indicator.

The determining means of the device is responsive to the pressure differential indicator so that said determining means provides an operational state of said at least one unloader.

Further, the determining means is responsive to the pressure differential indicator so that said determining means provides an operational state of a first and second cylinder bank.

Further objects, features and advantages of the present invention will become apparent when reading the Detailed Description of the Invention in conjunction with the drawings.

DETAILED DESCRIPTION OF THE INVENTION

Figure 1:
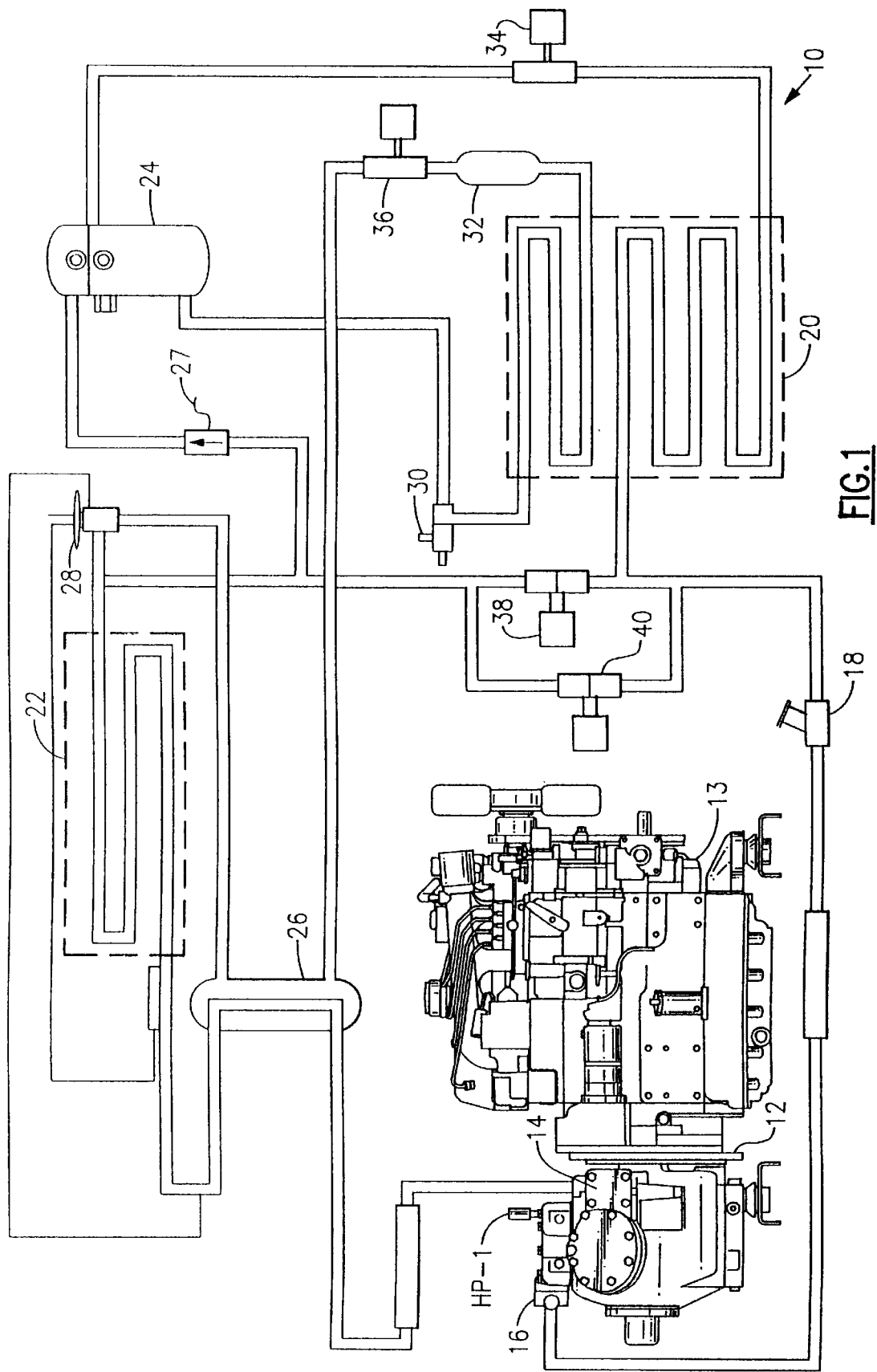
FIG. 1, is a schematic diagram of a refrigeration system in a cooling mode.

One particular example of a refrigeration system in which the present invention may be employed is shown in FIG. 1.

Refrigeration system 10 includes a compressor 12 driven by an engine 13, a suction service valve 14, a discharge service valve 16, a discharge check valve 18, an air cooled condenser 20 which includes a subcooler portion, an evaporator 22, a receiver 24, a heat exchanger 26, a bypass check valve 27, an expansion valve 28, a manual receiver shutoff valve 30, a filter drier 32, a plurality of valves 34, 36, 38, 40 (typically provided by solenoid valves), a front and rear unloader (not shown), a speed control solenoid 45 (FIG. 2), and an evaporator fan clutch (not shown). Compressor 12 includes a discharge or "high" side 15 and a suction, or "low" side 17. By convention, components of system 10 located toward high side 15 including discharge check valve 18 and condenser 20 are termed "high side" system components whereas system components located toward low side 15 including evaporator 22 and expansion valve 28 are termed "low side" system components. Furthermore, the region of system 10 between discharge side 15 and condenser 20 is conveniently referred to as the "high side" or "high pressure side" of system 10, while the region of system between condenser 20 and suction side 17 is conveniently referred to as the "low side" or "low pressure side" of system 10. Because valves 34–40 all operate to control the flow of refrigerant between high and low side system components, they are sometimes referred to herein as high to low side valves. The refrigeration system 10 operates in various modes, including a cooling mode and a heating/defrost mode. In the cooling mode, the refrigeration system 10 removes heat from a work space. In the heating mode, the refrigeration system 10 adds heat to the work space. In the defrosting mode, the refrigeration system adds energy to the evaporator, where the evaporator fan clutch is off, thus defrosting the evaporator.

Preliminarily, note that any known refrigerant may be used in the system, and that all references made to gas or liquid herein are actually referring to the state of the refrigerant at different places during operation. Generally, the purpose of the refrigerant is to pick up heat by evaporating at low pressure and temperature, and to give up heat by condensing at high temperature and pressure. For instance, by manipulating the pressure of the refrigerant to appropriate levels, the same refrigerant can evaporate at 40 degrees F. and condense at 120 degrees F. By evaporating at a low temperature, heat will flow from the work space into the refrigerant within the direct expansion evaporator 22. Conversely, the refrigerant rejects heat when it condenses from a gas into a liquid. This process is explained in greater detail below.

Operation of the refrigeration system 10 in a cooling mode of operation or a cooling cycle is as follows. In general, during the cooling cycle the evaporator 22 draws heat from the work space being cooled, whereas the condenser 20 is used to reject heat from the high pressure gas to the external environment.

To initiate a cooling cycle, a reciprocating compressor 12 receives low pressure refrigerant in the form of super-heated gas through a suction service valve 14 and compresses the gas to produce a high-pressure, super-heated gas. By reducing the volume of the gas, the compressor 12 establishes a high saturation temperature which enables heat to flow out of the condenser. The high pressure gas is discharged from the compressor 12 through a discharge service valve 16 and flows through a discharge check valve 18 into the condenser 20.

Next, a fan in the condenser 20 circulates surrounding air over the outside of condenser tubes comprising the coil. This coil is where the condensation takes place, and heat is transferred from the refrigerant gas to the air. By cooling the gas as it passes through the condenser 20, the removal of heat causes the gas to change state into a high-pressure saturated liquid. The refrigerant leaves the condenser as a high-pressure saturated liquid, and flows through valve 34, conveniently referred to as "condenser valve", into the receiver 24. As is shown in FIG. 1, valves 38 and 40, conveniently referred to as "hot gas valves", are closed thereby keeping the discharged gas from entering into a direct expansion evaporator 22.

From the air-cooled condenser 20, the high-pressure liquid then passes through open condenser valve 34 (sometimes referred to herein as condenser pressure control valve 34) and into a receiver 24. The receiver 24 stores the additional charge necessary for low ambient operation in a heating mode. The receiver 24 is equipped with a fusible plug which melts if the refrigerant temperature is abnormally high and releases the refrigerant charge. At the receiver 24, any gas remaining in the high-pressure liquid is separated and the liquid refrigerant then passes back through the manual receiver shutoff valve 30 (king valve) and into a subcooler section of the condenser 20 where it is subcooled. The subcooler occupies a portion of the main condensing coil surface and gives off further heat to the passing air. After being subcooled the liquid then flows through the filter-drier 32 where an absorbent keeps the refrigerant clean and dry. The high-pressure liquid then passes through the electrically controlled valve 36, conveniently referred to as "liquid line valve", which starts or stops the flow of refrigerant. In addition, the high-pressure liquid may flow to a heat exchanger 26. If so, the liquid is cooled even further by giving off some of its heat to the suction gas.

Next, the cooled liquid emerging from the heat exchanger 26 passes through an externally equalized thermostatic expansion valve 28. As the liquid is metered through the valve 28, the pressure of the liquid drops, thus allowing maximum use of the evaporator heat transfer surface. More specifically, this expansion valve 28 takes the subcooled liquid, and drops the pressure and temperature of the liquid to regulate flow to the direct expansion evaporator 22. This results in a low pressure saturated liquid/gas mixture.

After passing through the expansion valve 28, the liquid enters the direct expansion evaporator 22 and draws heat from the work space being cooled. The low pressure, low temperature fluid that flows into the evaporator tubes is colder than the air that is circulated over the evaporator tubes by the evaporator fan. As a result, heat is removed from the air circulated over the evaporator 22. That is, heat from the work space is transferred to the low pressure liquid thereby causing the liquid to vaporize into a low-pressure gas, thus, and the heat content of the air flowing over the evaporator 22 is reduced. Thus, the work space experiences a net cooling effect, as colder air is circulated throughout the work space to maintain the desired temperature. Optionally, the low-pressure gas may pass through the "suction line/liquid line" heat exchanger 26 where it absorbs even more heat from the high pressure/high temperature liquid and then returns to the compressor 12.

After passing through the heat exchanger 26, the gas enters the compressor 12 through the suction service valve 14 where the process repeats itself. That is, the air cooled by the evaporator 22 is sent directly to the air conditioned work space to absorb more heat and to bring it back to the coil for further cooling.

The refrigeration system of the present invention may also be used to heat the work space or defrost the evaporator 22.

During the heating/defrost cycle, a low pressure vapor is compressed into a high pressure vapor, by transferring mechanical energy from a reciprocating compressor 12 to the gas refrigerant as it is being compressed. This energy is referred to as the "heat of compression", and is used as the source of heat during the heating/defrost cycle. This refrigeration system is known as a "hot gas heat" type refrigeration system since the hot gas from the compressor is used as the heat source for the evaporator. By contrast, the present invention could also be employed with heat pumps wherein the cycle is reversed such that the heat normally rejected to the ambient air is rejected into the work space. The heating/defrost cycle will now be described in detail.

In the heating/defrost cycle, the reciprocating compressor 12 receives low pressure and low temperature gas through the suction service valve 14 and compresses the gas to produce a high pressure gas. The high temperature, high pressure gas is discharged from the compressor 12 through the discharge service valve 16. The hot gas valve 38 and the condenser pressure valve 34 are closed to prevent refrigerant from flowing through them. This closes off the condenser 20 so that once the condenser coils are substantially filled with refrigerant, the majority of the refrigerant will then flow through the discharge check valve 18 and the hot gas valve 40. The hot gas from the compressor 12 then flows into the evaporator 22, effectively transferring energy from the compressor to the evaporator and then to the work space.

A processor 100 opens valve 36 when the compressor discharge pressure falls to cut-in settings, allowing refrigerant from the receiver to enter the evaporator 22 through the expansion valve 28. The hot vapor flowing through valve 40 forces the liquid from the receiver 24 via a bypass check line and a bypass check valve 27. By opening valve 36 and closing valve 34, the refrigerant liquid is allowed to fill up and build up head pressure, equivalent to discharge pressure, in the condenser 20. Opening valve 36 also allows additional refrigerant to be metered through the expansion valve 28 so that it eventually is disposed in the condenser 20. The increase of the refrigerant in the condenser 20 causes the discharge pressure to rise, thereby increasing the heating capacity of the refrigeration system 10. This allows the compressor 12 to raise its suction pressure, which allows the refrigeration system 10 to heat. Liquid line valve 36 will remain open until the compressor discharge pressure increases to cut-out setting, at which point a processor 100 closes (shown in FIG. 2) solenoid valve 36. This stops the flow of refrigerant in the receiver 24 to the expansion valve 28. Significantly, valve 36 may be closed only after the compressor 12 is discharging at a cut-out pressure. Thus, via the evaporator 22, the high pressure refrigerant gas gives off heat to the work space, lowering the temperature of the refrigerant gas. The refrigerant gas then leaves the evaporator 22 and flows back to the compressor 12 through the suction service valve 14.

In a preferred embodiment, the hot gas valve 38 is closed if the ambient temperature is above a first predetermined temperature. If after a 60 second delay the engine remains in high speed, and the difference between ambient and discharge temperatures exceeds a predetermined temperature differential, then valve 38 opens. On the other hand, if the difference between ambient and discharge temperatures goes below a second pre-determined temperature differential, then valve 38 closes. When in engine operation and the discharge pressure exceeds pre-determined pressure settings, pressure cutout switch (HP-1) opens to deenergize the run relay coil and stop the engine.

Figure 2:
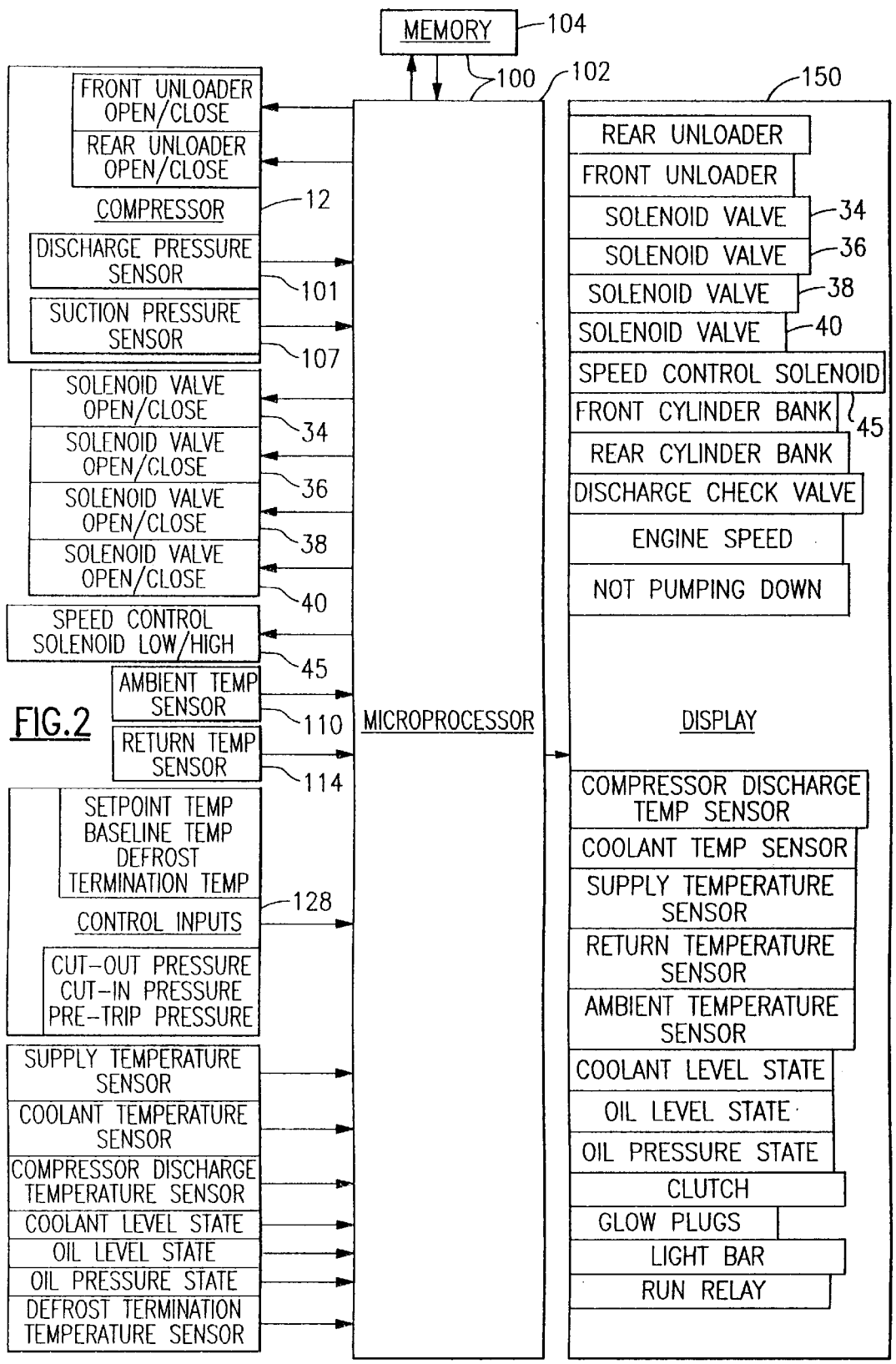
FIG. 2, is a block diagram showing a processor for interfacing with various components of the refrigeration system of FIGS. 1 and 2.

Turning to FIG. 2, the refrigeration system 10 is electronically controlled by a control unit shown as being provided by a processor 100, including a microprocessor 102 and an associated memory 104. The processor 100 is connected to a display 150 which displays various parameters and also various fault alarms that exist within the refrigeration system 10.

When the refrigeration system 10 is in an operating mode to control the temperature of a work space, the processor 100 receives several inputs including an ambient temperature from an ambient temperature sensor 110, a setpoint temperature, a return temperature from a return temperature sensor 114, a baseline temperature, a suction pressure from a suction pressure transducer 107, a discharge pressure from a discharge pressure transducer 101, a cutout pressure, a cut-in pressure and a pretrip pressure. The ambient temperature is received by the processor 100 through the ambient temperature sensor 110 on the exterior of the work space. The setpoint temperature is input to the processor 100 through an input control device 128 and is typically the desired temperature of the work space. The return temperature is the actual temperature of the work space and is received by the processor 100 through the return temperature sensor 114 located within the work space. The baseline temperature is input to the processor 100 through the input control device 128 and will be discussed later.

In addition, there are several other inputs to the processor 100 including a supply temperature, a coolant temperature, a compressor discharge temperature, a coolant level state, an oil level state, an oil pressure state, and a defrost termination temperature.

The suction pressure, sensed by the suction pressure transducer 107, is the pressure of the refrigerant vapor at the low side of the compressor 12 as it is being drawn into the compressor through the suction service valve 14. The suction pressure transducer 107 is disposed in a position to monitor the pressure through the suction service valve 14 and the suction pressure value is input to the processor 100, where the processor 100 uses the value or stores the value for later use.

The discharge pressure, sensed by the discharge pressure transducer 101, is the pressure at the high side of the compressor 12. This is the pressure of the refrigerant vapor as it is being discharged from the compressor 12 through the discharge service valve 16. The discharge pressure is monitored by a pressure transducer 101 disposed in a position to monitor the pressure through the discharge service valve 16 and the discharge pressure value is input to the processor 100, where the processor 100 uses the value or stores the value for later use.

At certain times during operation of refrigeration system 10 in an operational mode, such as a cooling, a heat/defrost mode, or a pretrip mode, it may be necessary to control an input to a system component based on a pressure differential indicator which indicates a pressure differential between different points in a refrigeration system such as between a high side and a low side of compressor 12. Because discharge pressure, suction pressure, and pressure differential normally predictably depend on one another, this pressure differential indicator can in general, be provided by any one of a discharge pressure reading, a suction pressure reading or pressure differential such as (discharge pressure minus suction pressure) reading or by a combination of such readings. Furthermore, because pressure is related to temperature, a pressure differential indicator can also normally be provided by a discharge temperature reading, a suction temperature reading, or temperature differential such as (discharge temperature minus suction air temperature) reading or by a combination of such readings. Under certain circumstances, however, such as where the refrigerant is subjected to temperature sensing in a vapor-only phase, a temperature transducer may not provide as reliable an indicator as pressure as a pressure transducer.

The cut-out pressure cut-in pressure and pretrip pressure are user selected pressure values that are input to the processor 100 through the input control device 128 and will be discussed below.

The processor 100 determines whether to operate refrigeration system 10 in a cooling mode or heating mode by comparing the setpoint temperature to the supply and/or return temperature. If the setpoint temperature is less than the return temperature, then processor 100 operates the refrigeration system 10 in a cooling mode. If the setpoint temperature is greater than the return temperature, then processor 100 operates refrigeration system 10 in a heating mode.

In the cooling mode, the processor 100 opens and closes high-to-low side valves 34 40 according to a required protocol as described previously herein in connection with FIG. 1. In particular, the processor 100 opens valves 34 and 36 and closes valves 38 and 40, which forces the refrigerant to flow from the compressor 12 to the condenser 20, through the condenser 20 and to the receiver 24, through the receiver 24 and back to the condenser 20, through the condenser 20 and to the heat exchanger 26, through the heat exchanger 26 and through the expansion valve 28 and then to the evaporator 22, through the evaporator 22 and back through the heat exchanger 26, and then back to the compressor 12. The details of the cooling mode have been discussed above.

In the heating mode, the processor 100 opens and closes high-to-low side valves 34–40 according to a required protocol and as described previously according to FIG. 1. In particular, the processor 100 closes condenser valve 34 and opens hot gas valve 40, which causes the condenser 20 to fill with refrigerant, and forces the hot gas from the compressor 12 into the evaporator 22. The liquid line valve 36 remains open until the discharge pressure reaches the cut-out pressure, at which point the processor 100 de-energizes and closes the liquid line valve 36 thereby stopping the flow of refrigerant into the expansion valve 28. When the compressor discharge pressure falls to the cut-in pressure, the processor 100 in turn energizes the closed liquid line valve 36 which opens, allowing refrigerant from the receiver 24 to enter the evaporator 22 through the expansion valve 28. Typically, in the heating mode, valve 38 remains closed until the compressor discharge temperature rises by a predetermined amount at which point valve 38 opens. The details of the heating mode have been discussed above. From time to time, the refrigeration system 10 will be caused to cease operating in a cooling or heating/defrost mode. For example, refrigeration system 10 is employed to control the air temperature of a tractor trailer work space (known as a "box") it is typical to take the refrigeration system 10 out of a cooling or heating/defrost mode when a door of the trailer is opened for loading or unloading goods from the box. Before starting up the refrigeration system 10, or restarting the system 10 after a temporary shutdown, it is sometimes desirable to have the processor 100 execute a routine in order to determine the operational condition of various components of the refrigeration system 10. Because such a routine is useful in determining component problems which may cause the refrigeration system 10 to malfunction when placed on-line (that is, caused to operate in a cooling or heat/defrost mode), such a routine may be referred to as a "pretrip" routine.

Preferably, the pre-trip routine comprises several tests for determining the mechanical operation of each of several system components such as high-to-low side valves 34, 36, 38, 40, the discharge check valve 18, a front unloader, a rear unloader, a front cylinder bank and a rear cylinder bank (not shown) of the compressor 12.

Referring now to particular aspects of the present invention, the present invention relates specifically to a test for testing the mechanical operation of a compressor of a refrigeration system. Processor 100 may administer the compressor test described herein immediately before or subsequent to administering other tests for testing various other system components, or else processor 100 may administer the present compressor test independent of administering other component tests, which may include the following tests: A test for testing for leaks between a high and low side of refrigeration system is described in related application Ser. No. 09233,770 Test for the Automated Detection of Leaks Between High and Low Pressure Sides of a Refrigeration System. A method for controlling discharge pressure during administration of such a test is described in related application Ser. No. 09/233,775 Control Algorithm for Maintenance of Discharge Pressure. A method for testing for leaks in a discharge check valve of a refrigeration system is described in related application Ser. No. 09/234,029 Method for Automated Detection of Leaks in the Discharge Check Valve. Each of the above related applications are incorporated herein by reference in their entireties.

Figure 3:
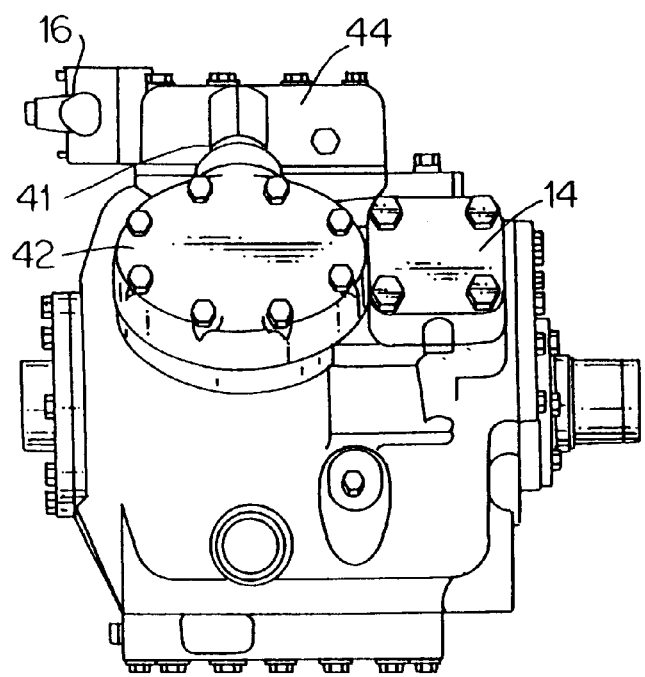
FIG. 3, is front perspective view of a compressor of the refrigeration system of FIGS. 1 and 2.
Figure 4:
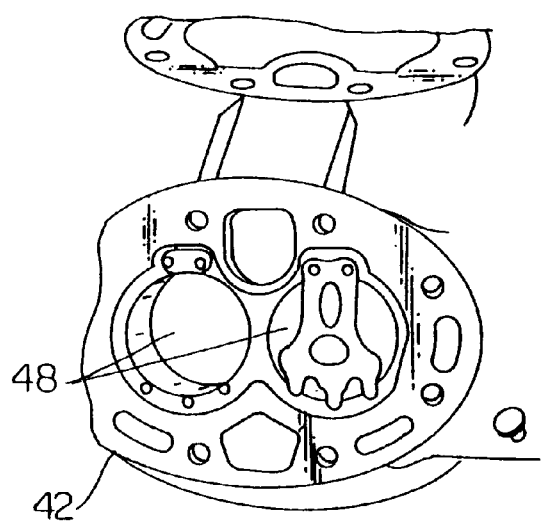
FIG. 4, is an internal perspective view of one cylinder bank of the compressor of FIG. 3.
Figure 5:
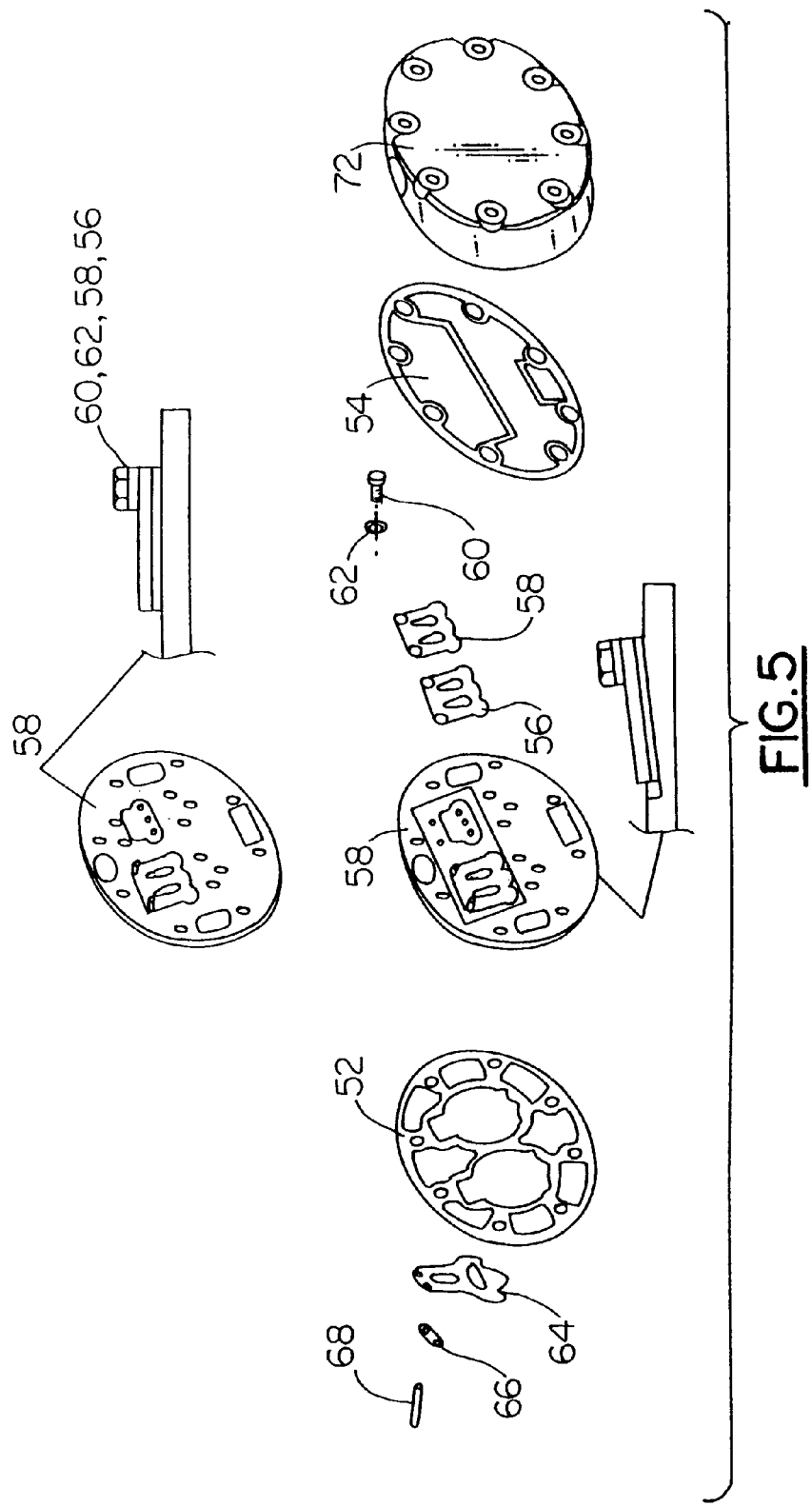
FIG. 5, is an exploded view of the gasket and valve system of the cylinder bank of FIG. 4.

An example of a type of compressor which may be tested by the compressor testing method of the invention is described with reference to FIG. 3. A compressor 12 includes a front cylinder bank 42, a center cylinder bank 44 and a rear cylinder bank (not shown), with each cylinder bank having two cylinders 48, shown in FIG. 4. Each cylinder 48 includes a piston 99, FIG. 7, within it for drawing in low pressure refrigerant gas. Each cylinder bank has a valve plate 50, FIG. 5, connected toward its distal end. A valve plate gasket 52, positioned proximally adjacent to the valve plate 50, supports a pair of suction valves 64. A position spring 66 and a dowel pin 68 secure the suction valves 64 to the valve plate gasket.

A cylinder head gasket 54 is positioned distally adjacent the valve plate 50, with a pair of discharge valves 56 and discharge valve stops 58 disposed therebetween, one each per cylinder. A capscrew 60 and a lockwasher 62 secure the discharge valves 56 and discharge valve stops 58 to the valve plate 50.

On the downstroke, the piston 99 opens the suction valve 64 thereby admitting low pressure refrigerant gas into the cylinder 48. On the upstroke, the piston 99 compresses the gas and discharges the compressed gas through the discharge valve 56. The compressed gas forces the suction valve 64 closed on the upstroke. Likewise, the admitted gas forces the discharge valve 56 closed on the downstroke. The discharged compressed gas exits each cylinder bank via a discharge manifold 70. Each cylinder bank discharge manifold 70 leads to the discharge service valve 16, which is typically disposed at a distal portion of the center cylinder bank 44. The refrigerant gas admitted into the compressor 12 through the suction service valve 14 flows to an internal cavity (not shown) of the compressor 12. Each cylinder of the compressor 12 receives refrigerant gas from the internal cavity via a suction cavity 91.

Figure 6:
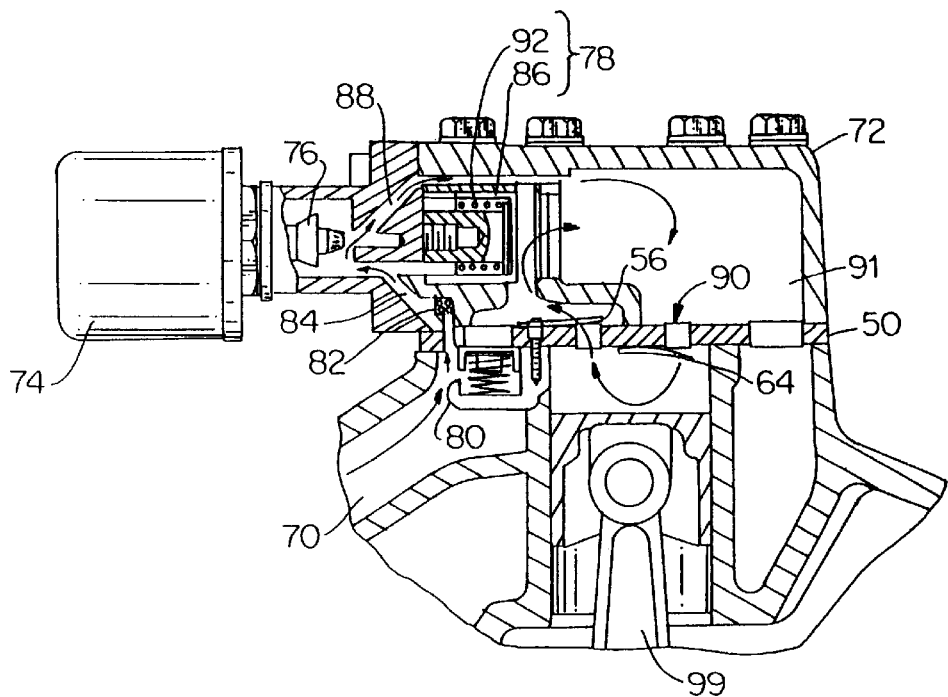
FIG. 6, is a cross-sectional view of the cylinder bank of FIG. 4 showing an unloader in the unloaded position.

Turning back to FIG. 3, the front unloader 41 is connected to the front cylinder bank 42 and the rear unloader (not shown) is connected to the rear cylinder bank (also not shown). Both the front and rear unloaders operate in the same fashion. The unloader 41 is connected to a port in the cylinder head 72, shown in FIGS. 6 and 7. The unloader 41 consists of a solenoid 74 and valve system 76, a spring loaded piston type bypass control valve 78, and a spring loaded discharge check valve 80.

Pressure from the discharge manifold 70 passes through the strainer 82 and bleed orifice 84 to the back of the piston bypass valve 78. Unless bled away this pressure tends to close the unloader piston 86 against the piston spring pressure. With the solenoid 74 energized, a solenoid valve stem 76 opens gas bypass port 88. Refrigerant pressure bleeds to the suction manifold 90 through the opened gas bypass port 88. A reduction in pressure on the piston bypass valve 78 takes place because the rate of bleed through the gas bypass port 88 is greater than the rate of bleed throughout the bleed orifice 84.

When the pressure behind the solenoid piston 86 has been reduced sufficiently, the valve spring 92 forces the piston bypass valve 78 back, thereby opening the gas bypass port 88 from the discharge manifold 70 to the suction manifold 90.

The unloaded cylinder bank continues to operate fully unloaded until the solenoid valve 74 control device is de-energized thereby closing the gas bypass port 88.

Figure 7:
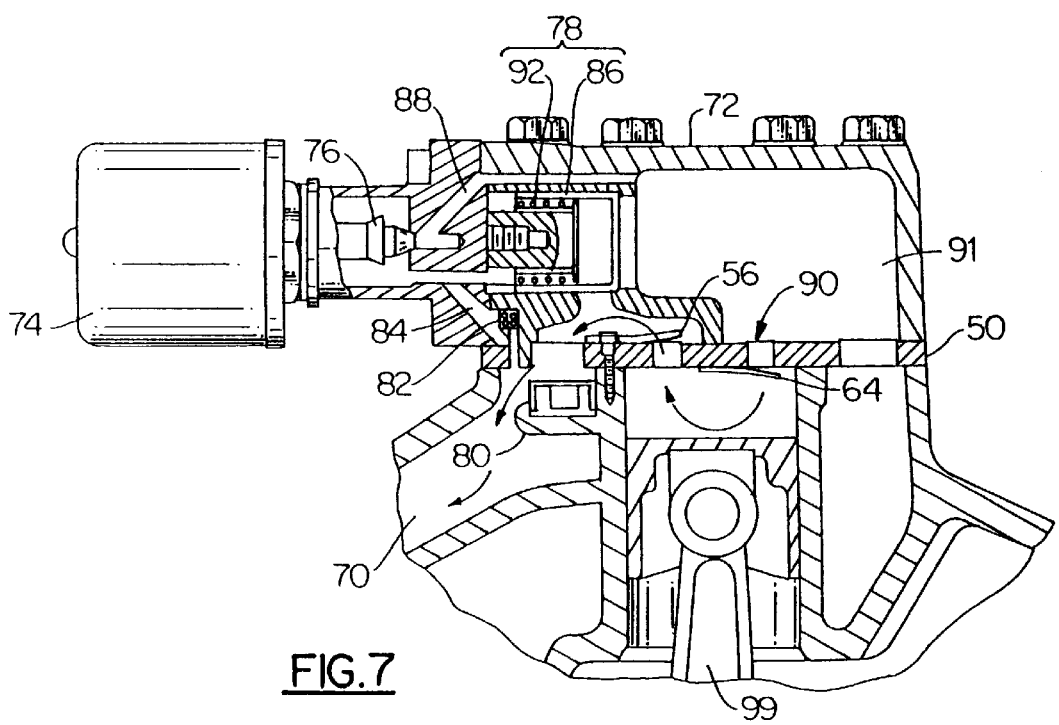
FIG. 7, is a cross-sectional view of the cylinder bank of FIG. 4 showing an unloader in the loaded position.

FIG. 7 shows the flow of compressed refrigerant with the compressor cylinder head 72 loaded. Discharge pressure bleeds from the discharge manifold 70 through the strainer 82 and bleed orifice 84 to the solenoid valve stem chamber and the back of the piston bypass valve 78. With the solenoid 74 de-energized, the solenoid valve stem 76 closes the gas bypass port 88. Refrigerant pressure overcomes the bypass valve spring 92 tension and force the solenoid piston 86 forward, thereby closing the gas bypass port 88 from the discharge manifold 70 to the suction manifold 90. Cylinder discharge pressure forces open the discharge piston check valve assembly 80, thus allowing refrigerant gas to pass into the compressor discharge manifold 70.

The loaded cylinder bank continues to operate fully loaded until the solenoid valve 74 control device is energized thereby opening the gas bypass port 88.

The unloaders are important for capacity control. By energizing or opening the unloader solenoid valve 74, the discharge gas circulates within the cylinder bank 42. The unloaded cylinders operate with little or no pressure differential, consuming very little power while discharging very little, if any, compressed gas. If one cylinder bank is being bypassed because its unloader is open, then the compressor 12 discharges compressed gas at a rate approximately proportional to the number of active cylinders as compared to the total number of available cylinders. As a result, the unloaders can help control the rate of heating or cooling.

As stated, the performance of a compressor 12 can be modified by loading and unloading the cylinder banks. Holding the return and ambient temperatures constant, different combinations of the same number of cylinders should provide nearly identical performance if the compressor 12 is functioning properly. For example, in a six cylinder compressor having three cylinder banks, the compressor 12 should provide the same performance if cylinders 1, 2, 3 and 4 are loaded as when cylinders 3, 4, 5 and 6 are loaded because the number of cylinders is identical in each case. If the performance is substantially different, either the compressor 12 is not functioning properly or a problem exists with one or more unloaders.

It is important that the head pressure in the condenser 20 reach a predetermined value in order to test the unloaders. If the head pressure were too low, then there would be a very small change between the compressor discharge pressure produced by a loaded and unloaded cylinder bank.

Figure 8:
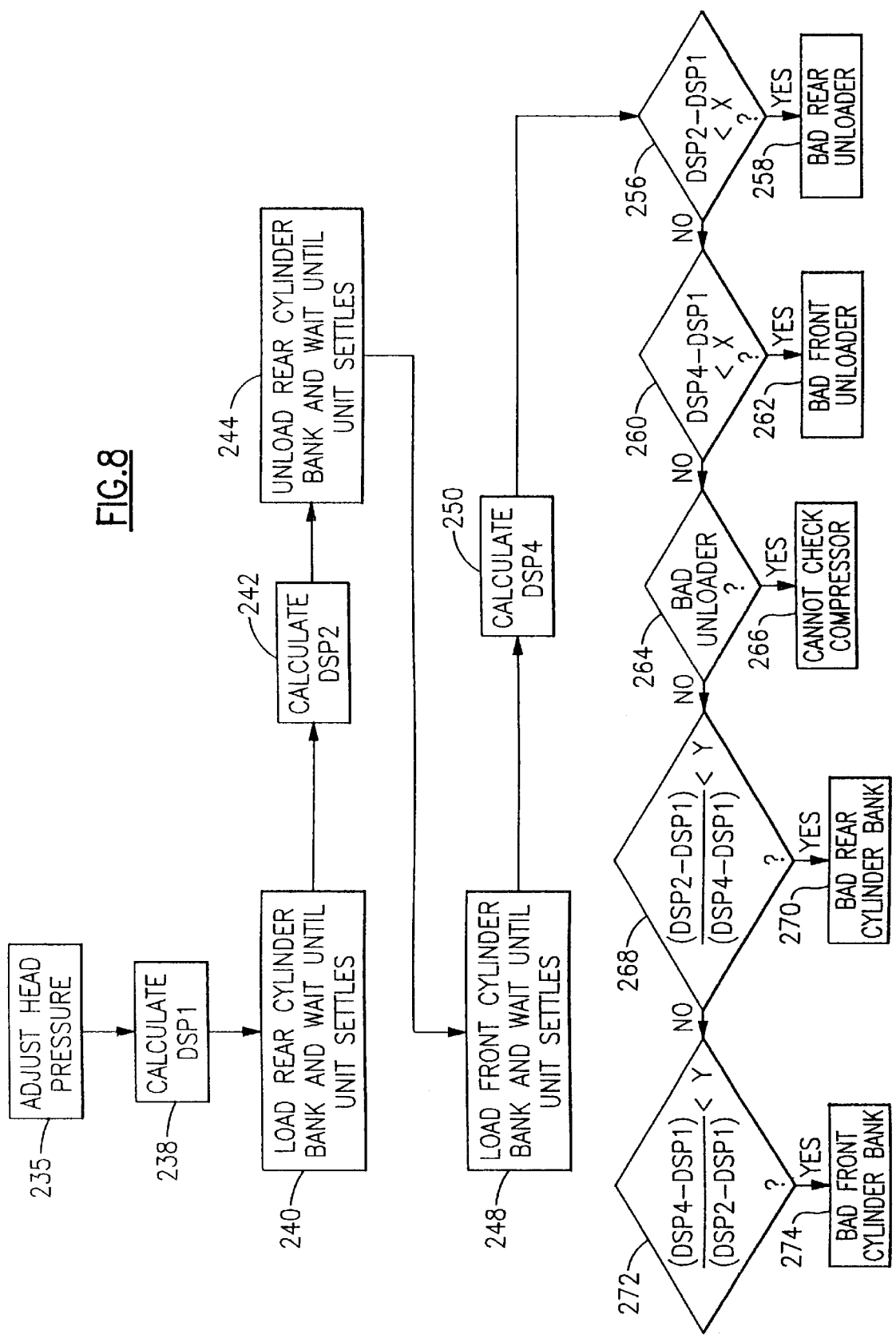
FIG. 8, is a functional block diagram of a first preferred embodiment of the present invention.

Referring now to particular aspects of the compressor testing method of the invention, a flow diagram illustrating a possible series of operations which may be carried out by processor 100 for testing aspects of mechanical operation of a compressor 12 is shown in FIG. 8. FIG. 8 shows a method for determining if a compressor cylinder bank 42 or compressor unloader has a problem with use of a differential pressure reading as a differential pressure indicator. Before checking a compressor unloader, a number of preliminary checks assure the operational performance if the system alarm signals, electrical connections, and system sensors. For instance, a display and buzzer test checks the performance of the LED's, annunciators icons, and LCD display and buzzer (not shown). Next, current checks verify the electrical connections and components of the system are intact (not shown). The sensors are checked for operational performance including the return air temperature sensor, the supply air temperature sensor, the coolant temperature sensor, the battery current sensor, the ambient air temperature sensor, the defrost termination temperature sensors, and the compressor discharge temperature sensor (not shown). These preliminary electrical tests are discussed in more detail in related application Ser. No. 09/234,041 Pre-trip Routine Comprising Tests of Individual Refrigeration System Components which is incorporated herein by reference in its entirety.

Further, checking the unloaders, the head pressure should be adjusted, as indicated in step 235. With the refrigeration system engine 13 started, a cool pretrip or heat pretrip subroutine may be selected by comparing the ambient air temperature to the baseline temperature. If the ambient air temperature read by the processor 100 is greater than the baseline temperature, then a cool pretrip is selected by processor 100. If the ambient air temperature is less than or equal to the baseline temperature, then a heat pretrip is selected by processor 100. In addition, there may be other pretrip routines selected based on any system parameter which is discussed in detail in related application Ser. No. 09/234,032 Adaptive Pre-trip Selection, which is incorporated herein by reference.

For a cool pretrip, the system 10 operates in a low-capacity cooling state defined by opening condenser valve 34 and liquid line valve 36, closing hot gas valves 38 and 40, unloading the compressor 12 front and rear cylinder banks, and de-energizing the speed control solenoid thereby having the compressor run on low speed. The system 10 runs in low speed for repeatability because all systems 10 should be able to run in low speed even if the speed control solenoid is disconnected. However, it should be apparent that either the cool or heat pretrip could also be run on high speed. In this cool pretrip, the discharge pressure builds naturally because of the warm ambient temperature. The refrigeration system 10 runs for a predetermined time until a quasi-steady state is reached where there are no sudden pressure spikes. At this point, the rest of the pretrip routine is performed.

During the heat pretrip subroutine, processor opens valve 36 and valve 40 and closes valves 34 and 38. The processor 100 unloads only one cylinder bank (e.g., front cylinder bank) of the compressor 12, thereby generating more mass flow and, therefore, higher discharge pressures faster. The system runs in low speed for repeatability because all systems 10 should be able to run in low speed even if the speed control solenoid is disconnected. With liquid line valve 36 open and condenser valve 34 closed, the refrigerant from the receiver 24 flows into the condenser 20 and causes the head pressure within the condenser 20 to build up. Once the discharge pressure from the compressor 12 reaches the pretrip pressure, the processor 100 opens valve 34, thereby allowing the discharge pressure to drop. The processor 100 then closes valve 34 allowing the discharge pressure to return until the system 10 reaches the pretrip pressure. At this point, the processor 100 unloads the previously loaded cylinder bank, which allows the unloader pretrip subroutine to be performed.

In order to check the operational performance of the unloaders and/or cylinder banks of the compressor 12, various compressor discharge pressures and suction pressures are measured and compared. The discharge pressure and suction pressure normally differ in a predictable manner according to the number of cylinder banks being loaded or unloaded. A higher discharge pressure and a lower suction pressure occur when there are more cylinder banks loaded. Further, the discharge pressure and suction pressure remain the same when the same number of cylinder banks are operating unloaded, all other things being equal. For example, if one cylinder bank is unloaded, the discharge pressure and suction pressure are the same value regardless of which cylinder bank is unloaded. If, in the above example, the discharge pressure and suction pressure are substantially different when one cylinder bank is unloaded for different cylinder banks, then processor 100 determines that a problem exists with one of the unloaders or a cylinder bank.

After the system has been properly set up so that the compressor 12 has sufficient head pressure, the processor 100 reads the values of the discharge pressure and the suction pressure (with both the front and rear cylinder banks being unloaded) and assigns the value of the difference between the discharge pressure and the suction pressure as DSP1, shown in step 238. Next, the processor loads the rear cylinder bank and waits until the system settles (usually about 10 seconds) before calculating the difference between the discharge pressure and the suction pressure a second time, which value is assigned as DSP2, shown in steps 240 and 242.

Next, the processor 100 unloads the rear cylinder bank and loads the front cylinder bank and waits again until the system settles before calculating the difference between the discharge pressure and the suction pressure a third time, which value is assigned as DSP4, shown in steps 244, 248 and 250.

The processor 100 determines the operational condition of the rear unloader by comparing the pressure differential DSP1 to the pressure differential DSP2. If the difference between the pressure differential DSP2 and the pressure differential DSP1 is less than a first predetermined value (e.g., 5.0), then a problem exists with the rear unloader, which is displayed by the processor 100 on display 150, shown in blocks 256 and 258.

The processor 100 determines the operational condition of the front unloader by comparing the pressure differential DSP1 to the pressure differential DSP4. If the difference between the pressure differential DSP4 and the pressure differential DSP1 is less than a first predetermined value, then a problem exits with the front unloader, which is displayed by the processor 100 on display 150.

In order to determine whether the front or rear cylinder banks are working properly, both of the unloaders must first be determined to be in operational condition, as is indicated at steps 264 and 266. When both the front and rear cylinder banks are unloaded, the resulting pressure differential DSP1 is the smallest. After one of the cylinder banks are loaded, the resulting pressure differential DSP2 or DSP4 rises a set amount. If after one of the cylinder banks are loaded, the pressure differential does not rise a set amount, but only a portion of the set amount, then it is determined that a problem exists (typically a suction or discharge valve) within the now loaded cylinder bank.

From the previous values (DSP1, DSP2, and DSP4) obtained the front and rear cylinder banks are now checked. The rear cylinder bank is checked according to the following equation, shown in steps 268 and 270:

If (DSP2−DSP1)/(DSP4−DSP1) is less than a second predetermined value (e.g., 0.7), then a problem exits within the rear cylinder bank, which is displayed by the processor on the display 150.

The front cylinder bank is checked according to the following equation, shown in steps 272 and 274:

If (DSP4−DSP1)/(DSP2−DSP1) is less than the second predetermined value, then a problem exists in the front cylinder bank 42, which is displayed by processor 100 on display 150. When a cylinder bank becomes non-operational, it is normally because a valve has become worn or broken. By isolating within which cylinder bank the problem exists, the amount of time necessary to repair the compressor is minimized.

In alternative embodiments, a pressure differential indicator other than a pressure differential reading may be utilized to test for mechanical operation problems in compressor 12. These alternative embodiments are represented by the flow diagrams of FIGS. 9 and 10.

Figure 9:
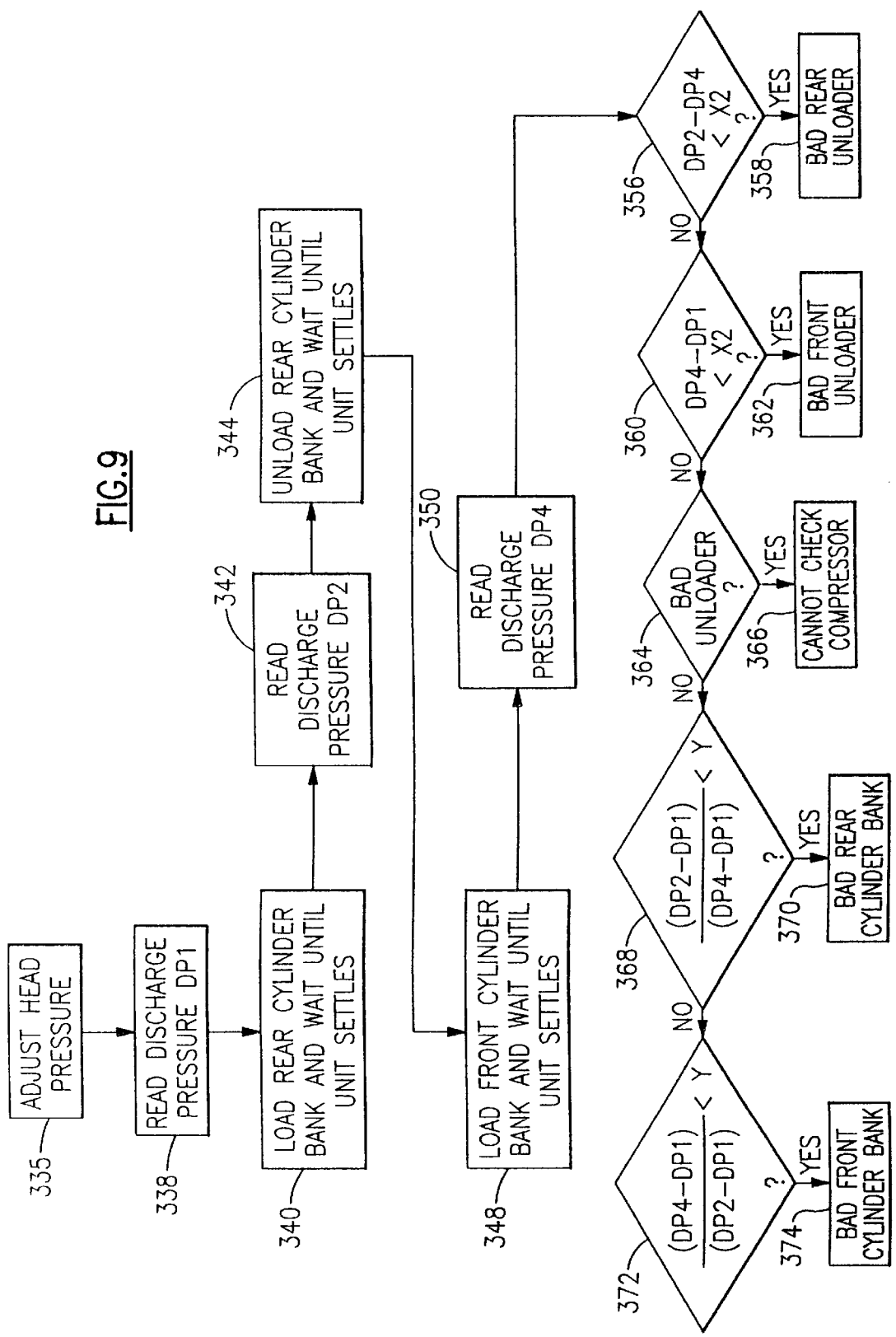
FIG. 9, is a functional block diagram of a second preferred embodiment of the present invention.

In FIG. 9, a method is shown for determining whether the unloaders and cylinder banks are non-operational utilizing discharge pressure as a pressure differential indicator. First the refrigeration unit 10 is prepared for testing by adjusting the head pressure in the same manner as before, shown in step 335. But now, instead of calculating the pressure difference between the discharge pressure and the suction pressure, only the discharge pressure DP1 is measured by the discharge pressure transducer and the read by the processor 100, shown as step 338. Next, the processor loads the rear cylinder bank and waits until the system settles before reading the discharge pressure DP2, shown by steps 340 and 342. The processor 100 then unloads the rear cylinder bank and loads the front cylinder bank and reads the discharge pressure DP4 after the system settles, as is indicated by steps 344, 348 and 350.

After reading the discharge pressure values DP1, DP2 and DP4, the operational performance of the unloaders may now be evaluated. If the difference between DP2 and DP1 is less than a third predetermined value, then it is determined that a problem exists with the rear unloader 41, as is indicated by steps 356 and 358. Likewise, if difference between DP4 and DP1 is less than the third predetermined value, then it is determined that a problem exists with the front unloader 40, as indicated by steps 360 and 362.

In order to determine whether the front or rear cylinder banks are working properly, both of the unloaders must first be determined to be in operational condition, shown as steps 364 and 366. From the previous values (DP1, DP2 and DP4) obtained the front and rear cylinder banks may be checked by the processor 100. The rear cylinder bank is checked according to the following equation, shown in steps 368 and 370:

If (DP2−DP1)/(DP4−DP1) is less than a fourth predetermined value, then a problem exists within the rear cylinder bank. The front cylinder bank is checked according to the following equation, shown in steps 372 and 374:

If (DP4−DP1)/(DP2−DP1) is less than the fourth predetermined value, then a problem exists within the front cylinder bank 42.

Figure 10:
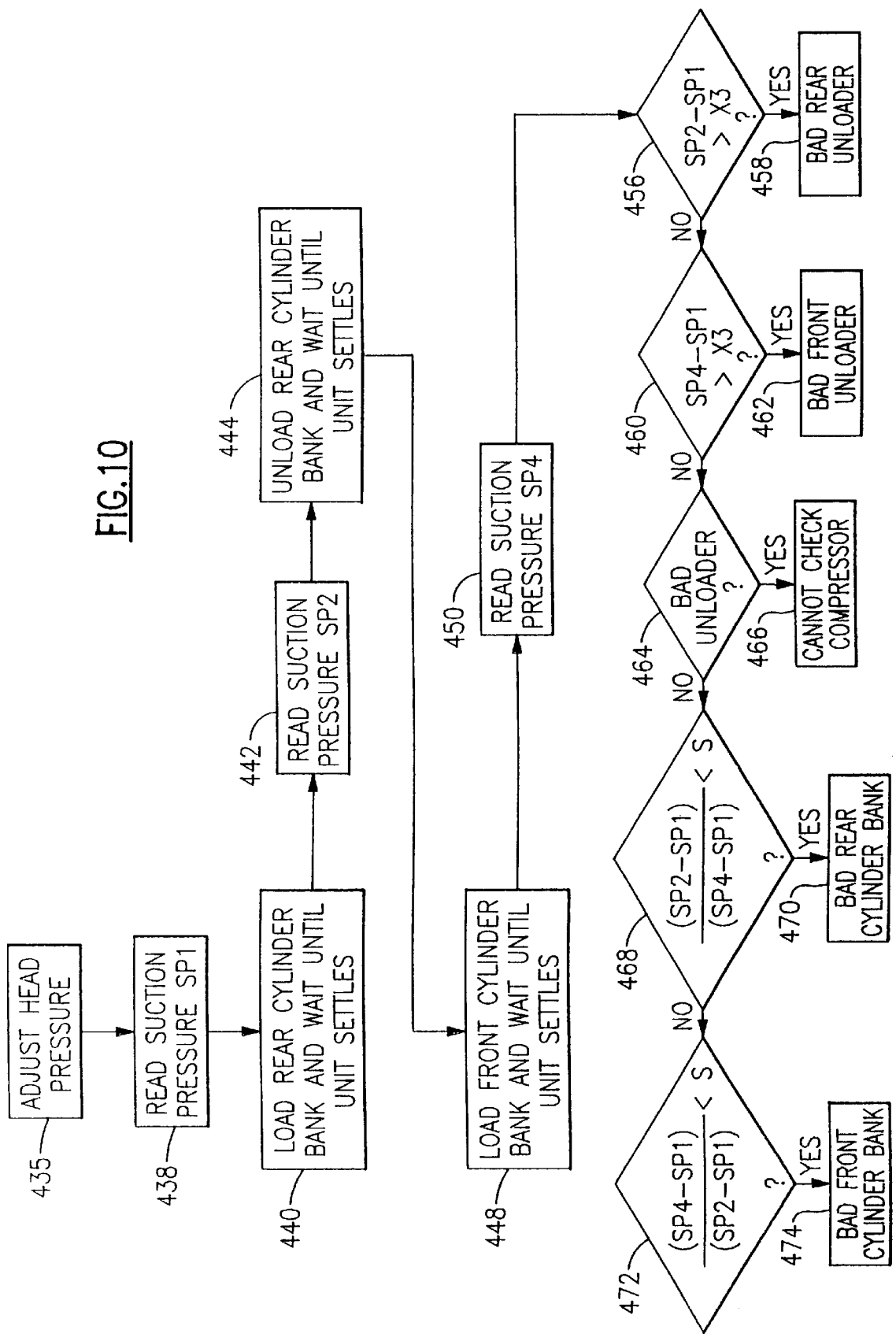
FIG. 10, is a functional block diagram of a third preferred embodiment of the present invention.

Similarly, the operational condition of the unloaders and cylinder banks can be evaluated by reading the suction pressures SP1, SP2 and SP4 and using the suction pressures as pressure differential indicators in the same fashion as indicated in FIG. 10 and comparing the absolute value of the suction pressure differences to fifth and sixth predetermined values, shown in steps 435–474.

Figure 11:
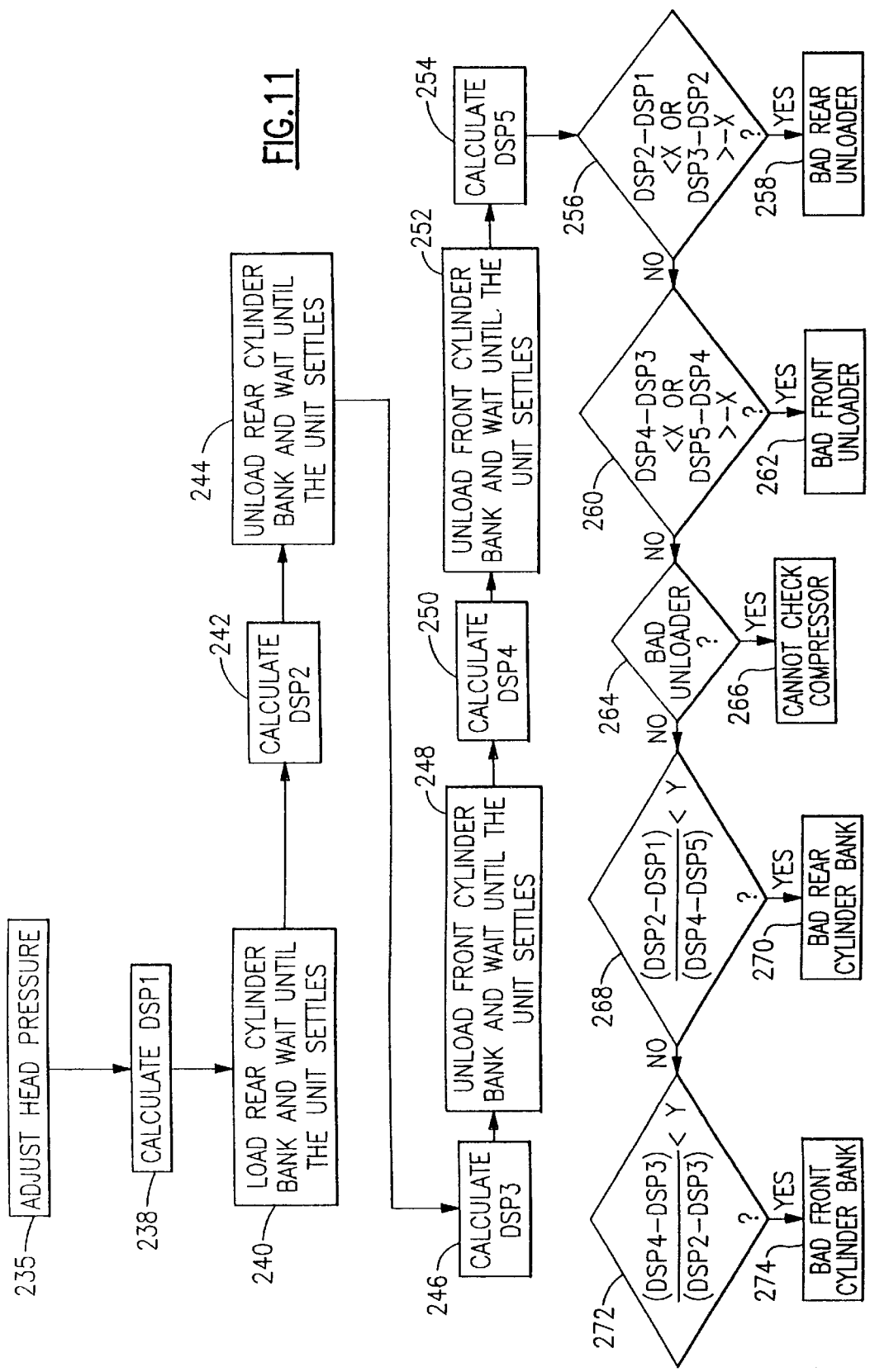
FIG. 11, is a functional block diagram of a fourth preferred embodiment of the present invention.
Figure 12:
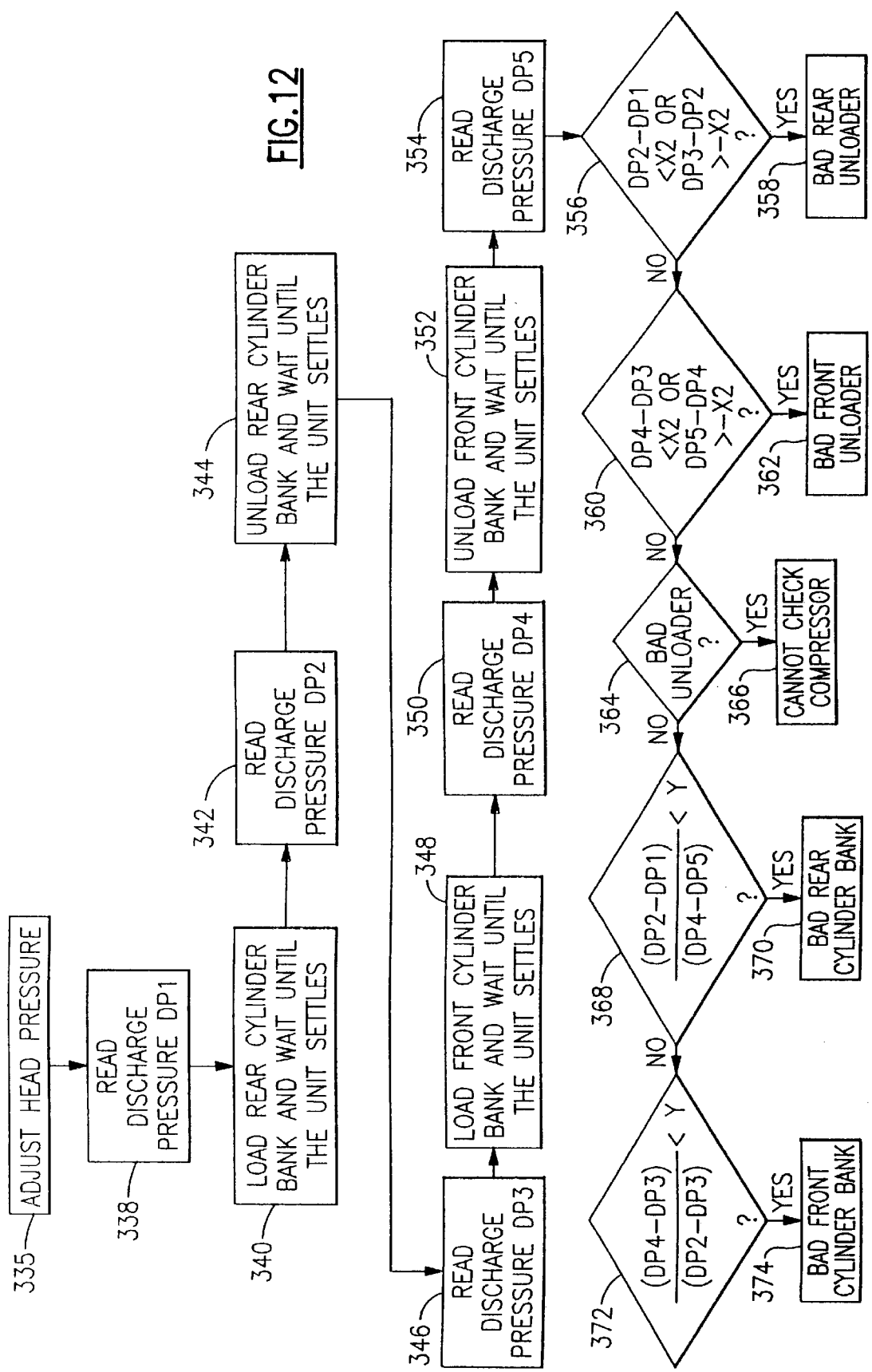
FIG. 12, is a functional block diagram of a fifth preferred embodiment of the present invention.
Figure 13:
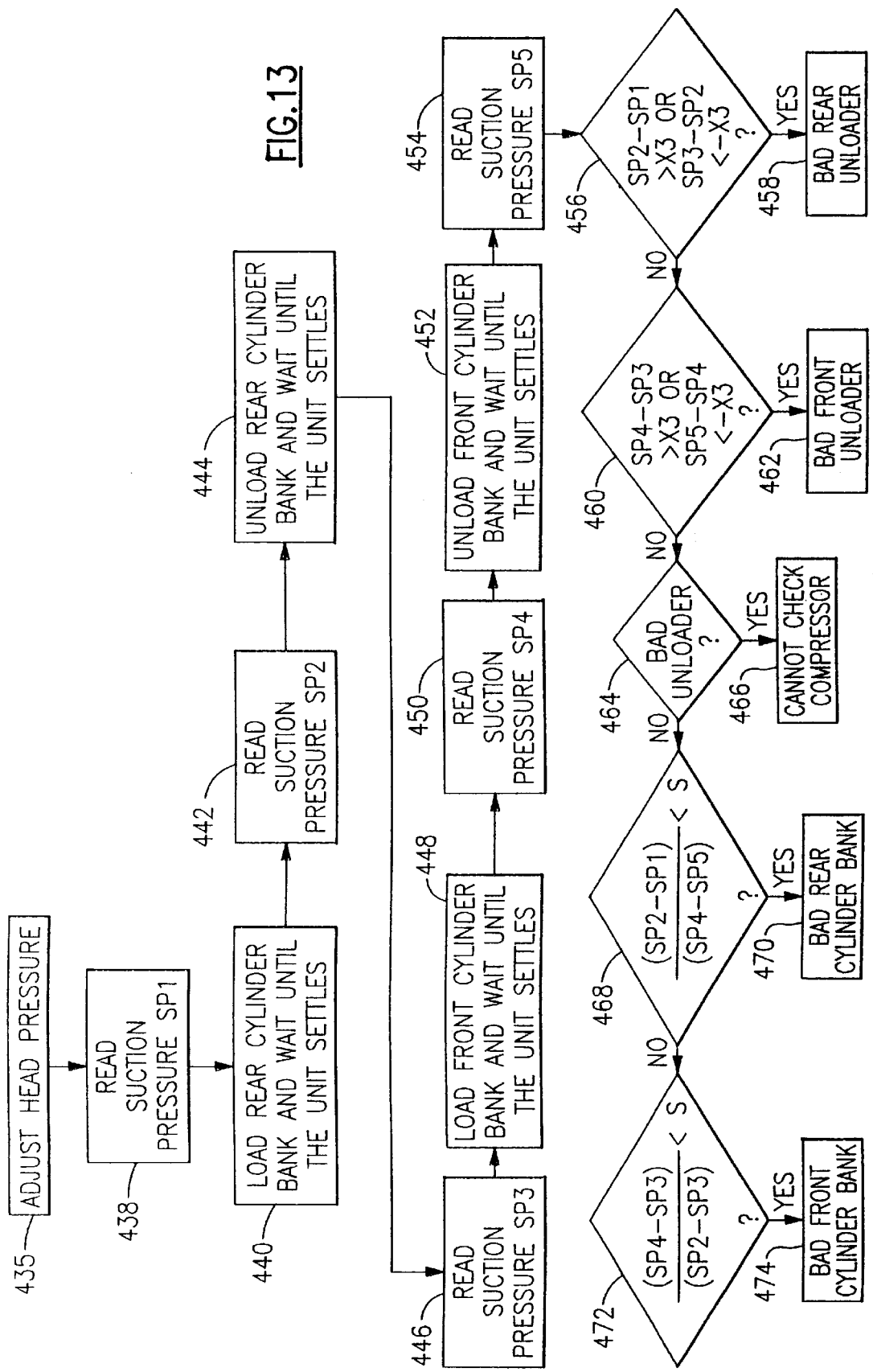
FIG. 13, is a functional block diagram of a sixth preferred embodiment of the present invention.

In other alternative embodiments, hysteresis can be provided for by performing additional steps, FIGS. 11–13. In FIG. 11, additional steps 246, 252 and 254 are provided which give additional values DSP3 and DSP5. Further, the equations in steps 256, 260, 268 and 272 are altered to account for the new values.

For instance in step 256 of FIG. 1 1, the processor checks the rear unloader by using the values DSP1, DSP2 and DSP3. If the absolute value of the difference between DSP2 and either DSP1 or DSP3 is less than a first predetermined value, then a problem exists with the rear unloader, shown as steps 256 and 258.

If the absolute value of the difference between DSP4 and either DSP3 or DSP5 is less than the first predetermined value, then a problem exists with the front unloader 41, shown as steps 260 and 262.

In order to determine whether the front or rear cylinder banks are working properly, both of the unloaders must first be determined to be in operational condition, shown as steps 264 and 266. From the previous values (DSP1–DSP5) obtained the front and rear cylinder banks are now checked. The rear cylinder bank is checked according to the following equation, shown in steps 268 and 270:

If (DSP2−DSP1)/(DSP4−DSP5) is less than a second predetermined value (e.g., 0.7), then a problem exists within the rear cylinder bank. The front cylinder bank is checked according to the following equation, shown in steps 272 and 274:

If (DSP4−DSP3)/(DSP2−DSP3) is less than the second predetermined value, then a problem exists within the front cylinder bank 42.

FIG. 12 shows an alternative embodiment of FIG. 9, with hysteresis once again being provided for. Additional steps 346, 352 and 354 are added to give two additional discharge pressure values DP3 and DP5. Further, the equations in steps 356, 360, 368 and 372 have been changed to account for the new values.

FIG. 13 shows an alternative embodiment of FIG. 10, with hysteresis once again being provided for. Additional steps 446, 452 and 454 are added to give two additional suction pressure values SP3 and SP5. Further, the equations in steps 456, 460, 468 and 472 have been changed to account for the new values.

Although the description of the invention has been drawn to a specific compressor embodiment, it should be apparent to one skilled in the art that other types and sizes of compressor (e.g., more cylinder banks and unloaders) could also be monitored in the same fashion as the invention described herein.

What is claimed is:

1. A method for testing a compressor of the type having at least one unloader, a first cylinder bank, and a second cylinder bank, said method comprising the steps of:

measuring a first pressure differential indicator;

loading said first cylinder bank;

measuring a second pressure differential indicator subsequent to said first cylinder bank loading step;

unloading said first cylinder bank;

loading said second cylinder bank;

measuring a third pressure differential indicator subsequent to said second cylinder loading step; and determining a location of a problem within said compressor based at least in part on at least two of said pressure differential indicators.

2. The method of claim 1, wherein said pressure differential indicators are pressure differential readings between discharge pressures and suction pressures of said compressor.

3. The method of claim 1, wherein said pressure differential indicators are discharge pressures of said compressor.

4. The method of claim 1, wherein said pressure differential indicators are suction pressures of said compressor.

5. The method of claim 1, wherein said determining step includes the step of finding a difference between said second and first pressure differential indicators to determine whether a problem exists in a first unloader of said compressor.

6. The method of claim 1, wherein said determining step includes the step of finding a difference between said third and said first pressure differential indicators to determine whether a problem exists in a second unloader of said compressor.

7. The method of claim 2, wherein said determining step includes the step of analyzing said first, second and third pressure differential indicators to determine whether a problem exists within said first cylinder bank of said compressor.

8. The method of claim 7, wherein said determining step includes the step of analyzing said first, second and third pressure differential indicators to determine whether a problem exists within said second cylinder bank of said compressor.

9. The method of claim 1, wherein said determining step includes the step of determining whether a problem exists within a specific component of said compressor, said specific component selected from the group consisting of a rear unloader, a front unloader, a rear cylinder bank and a front cylinder bank of said compressor.

10. The method of claim 1, wherein said determining step includes the step of analyzing at least two of said pressure differential indicators to determine if a problem exists within a specific unloader of said compressor.

11. The method of claim 10, wherein said determining step includes the step of analyzing said first, second and third of said pressure differential indicators to determine if a problem exists within a specific one of said cylinder banks of said compressor.

12. A method for testing a compressor of the type having a front unloader, a rear unloader, a front cylinder bank and a rear cylinder bank, said method comprising the steps of:

measuring a first pressure differential indicator;

loading said rear cylinder bank;

measuring a second pressure differential indicator subsequent to said rear cylinder bank loading step;

unloading said rear cylinder bank; and measuring a third pressure differential indicator subsequent to said rear cylinder bank unloading step;

loading said front cylinder bank;

measuring a fourth pressure differential indicator subsequent to said front cylinder loading step;

unloading said front cylinder bank;

measuring a fifth pressure differential indicator subsequent to said front cylinder unloading step; and determining a location of a problem within said compressor based at least in part on at least two of said pressure differential indicators.

13. The method of claim 11, wherein said pressure differential indicators are pressure differential readings between discharge pressures and suction pressures of said compressor.

14. The method of claim 13, wherein said pressure differential indicators are discharge pressures of said compressor.

15. The method of claim 14, wherein said pressure differential indicators are suction pressures of said compressor.

16. The method of claim 15, wherein said determining step includes the step of finding a difference between said second and first pressure differential indicators to determine whether a problem exists in a rear unloader of said compressor.

17. The method of claim 16, wherein said determining step includes the step of finding a difference between said fourth and said third pressure differential or between said fifth and said fourth of said pressure differential indicators to determine whether a problem exists within a front unloader of said compressor.

18. The method of claim 14 wherein said determining step includes the step of analyzing said first, second, fourth and fifth pressure differential indicators to determine whether a problem exists within said rear cylinder bank of said compressor.

19. The method of claim 14, wherein said determining step includes the step of analyzing said second, third and fourth pressure differential indicators to determine whether a problem exists within said front cylinder bank of said compressor.

20. The method of claim 19, wherein said determining step includes the step of determining whether a problem exists within a specific component of said compressor, said specific component selected from the group consisting of a rear unloader, a front unloader, a rear cylinder bank and a front cylinder bank of said compressor.

21. The method of claim 20, wherein said determining step includes the step of analyzing at least two of said pressure differential indicators to determine if a problem exists within a specific unloader of said compressor.

22. The method of claim 14, wherein said determining step includes the step of analyzing said first, second and third of said pressure differential indicators to determine if a problem exists within a specific one of said cylinder backs of said compressor.

23. A refrigeration system comprising:

a compressor having a front unloader a rear unloader, a front cylinder bank, and a rear cylinder bank;

an evaporator;

a condenser for removing heat from said refrigeration system;

means for measuring a first pressure differential indicator of said system;

means for loading said rear cylinder bank;

means for measuring a second pressure differential indicator subsequent to said rear cylinder bank loading means loading said rear cylinder bank;

means for unloading said rear cylinder bank;

means for loading said front cylinder bank;

means for measuring a third pressure differential indicator subsequent to said front cylinder loading means loading said front cylinder bank; and means for determining a location of a problem within said compressor by considering at least two of said pressure differential indicators.

* * * * *